Figure 1:
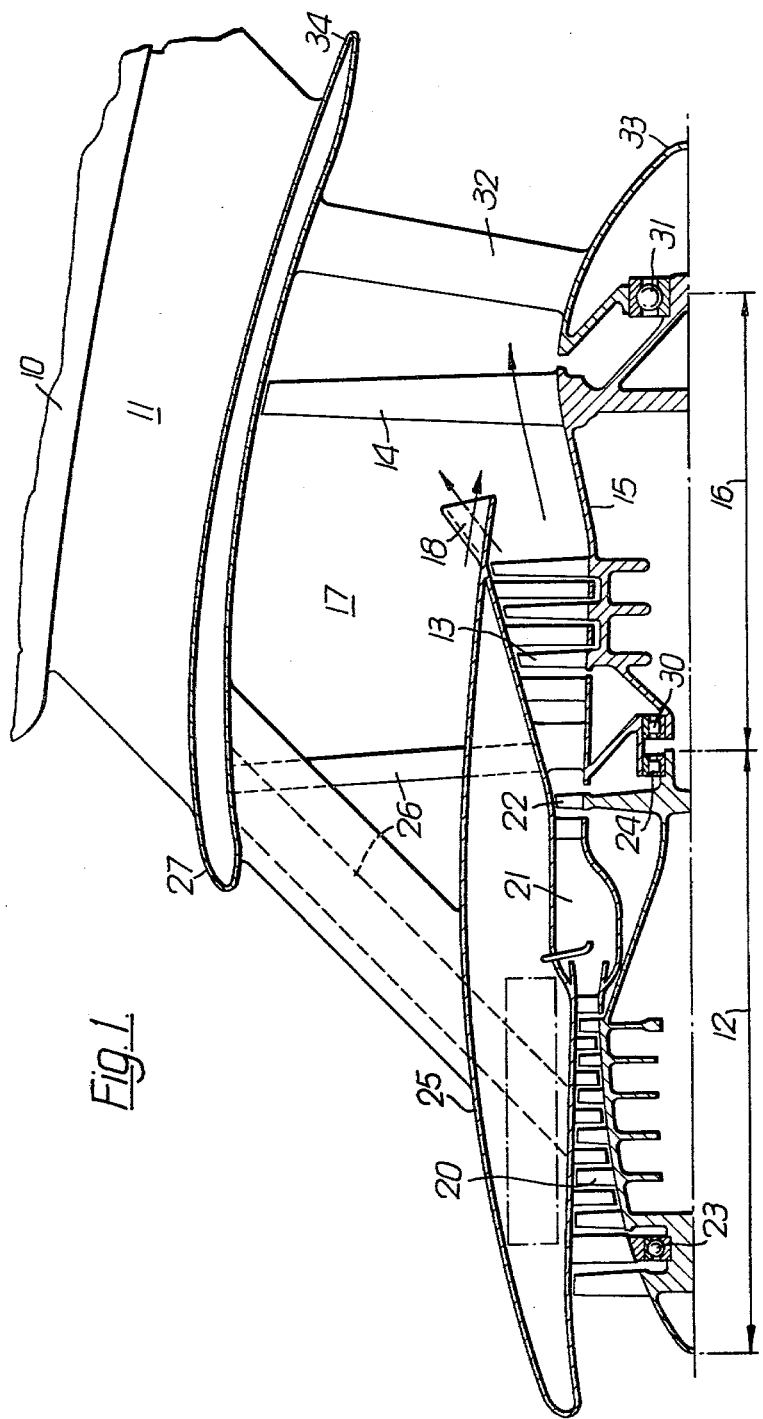

United States Patent [19]

Snell

[11] 4,183,210
[45] Jan. 15, 1980

[54] GAS TURBINE ENGINE POWERPLANTS

[75] Inventor: Leonard S. Snell, Bristol, England

[73] Assignee: Rolls-Royce Limited, London, United Kingdom

[21] Appl. No.: 868,385

[22] Filed: Jan. 10, 1978

[30] Foreign Application Priority Data

Jan. 19, 1977 [GB] United Kingdom ............... 2018/77

[51] Int. Cl.² .............................................. F02K 3/06
[52] U.S. Cl. ......................................... 60/204; 60/262
[58] Field of Search .................................. 60/262, 204

[56] References Cited

U.S. PATENT DOCUMENTS 3,968,647  7/1976  Boudigues .............................. 60/262

Primary Examiner—Robert E. Garrett
Attorney, Agent, or Firm—Stevens, Davis, Miller & Mosher

[57] ABSTRACT

A ducted fan gas turbine powerplant consists of a core gas generator, which may be a single or two-shaft gas generator, and which drives a fan at the downstream end of the powerplant. The exhaust from the gas generator is mixed with flow in the fan duct and the fan operates on the mixed stream as a working fluid.

2 Claims, 3 Drawing Figures

GAS TURBINE ENGINE POWERPLANTS

This invention relates to an aircraft propulsion powerplant and more particularly to a gas turbine engine of the bypass type for installation in such a powerplant. Current subsonic aircraft are powered by bypass gas turbine engines and these engines have the advantages of lower noise and lower specific fuel consumption compared to the earlier generations of gas turbine propulsion engines.

Bypass gas turbine engines usually comprise a fan mounted for rotation in a bypass duct and driven by a fan turbine and a section of the engine called a gas generator or core, which has a compressor, a combustor and a turbine in flow series, the purpose of which is to deliver a stream of hot propulsive gas to the fan turbine to drive it. The gas generator section can comprise a single compressor and a single turbine connected together through a single shaft, or multiple compressors and corresponding turbines each connected by respective shafts. In very many designs the fan turbine is positioned at the downstream end of the engine and is connected through shafting to the fan which is at the front of the engine. This arrangement requires a very large diameter hole through the middle of the gas generator to accommodate the shaft which connects the fan turbine to the fan and the need to provide such a large hole in the basic design of the engine proves to be a considerable constraint upon the design of the gas generator. This becomes particularly acute with increasing overall pressure ratios of the order of 30:1 and higher bypass ratios of the order of 8:1.

Designs of engines are known in which the fan is positioned downstream of the gas generator and the fan is then referred to as an "aft fan". In such aft fan arrangements the fan is connected directly to its turbine. This connection does not pass through the gas generator and therefore does not act as a constraint on the gas generator layout when it is being designed. The gas generator can therefore be given its most convenient and most efficient layout.

In particular the gas generator aerodynamics constitute a difficult piece of design and when the constraint of having to include a large central opening for the fan shaft exists the aerodynamics at the highest compression represent an exceedingly difficult design problem. When the fan shaft does not have to pass through the gas generator this difficulty is eased.

However, presently known aft fan arrangements have proved to have disadvantages which have prevented them from being widely adopted. In known aft fan arrangements two forms of layout have been proposed, in both of which considerable efforts have been made to avoid mixing of the hot and cold gas streams because of the pressure differential between these streams. In the first of these the fan has been connected to its turbine through a short shaft so that the cold air bypass flow passing through the fan could be physically separated from the hot gas flow passing through the turbine and the two flows could be discharged to atmosphere separately. In the second arrangement the fan has been made in the form of an outer array around the outside of the fan turbine to form tiered blading in which the inner portion of the blading comprises the fan turbine and the outer portion of the blading provides the fan. In this latter design it has been found that either the losses caused by migration of the gas due to this pressure differential have been unacceptably high or that the provision of efficient sealing has given the powerplant an unacceptable weight penalty.

I have now found that advantages accrue from mixing the two flows and from operating on the mixed flow as the working fluid of the aft fan.

According to the invention there is provided a gas turbine engine powerplant comprising a gas generator, the output of which is arranged to drive a fan turbine arranged downstream of the gas generator, and a fan mounted for rotation within a bypass duct and downstream of the fan turbine and arranged to receive a combined flow made up of a flow of air from the bypass duct and a flow from the fan turbine exhaust and to operate on this combined flow as a working fluid.

Embodiments of the invention will now be described with reference to the accompanying drawings in which two figures are diagrammatic longitudinal sections through different arrangements of high bypass ratio gas turbine powerplants having aft fans and arranged in accordance with the invention, and, a third figure is a diagrammatic graph showing the pressure rise across the aft fan.

Referring now to FIG. 1 the powerplant is mounted on the wing 10 of an aircraft through a pylon 11. The gas turbine engine comprises a gas generator or core section or module shown at 12 with its gas efflux arranged to be delivered to and to drive a multi-stage gas turbine 13. This turbine is connected to a large diameter aft fan 14 through a shaft 15, thus forming a complete turbine and fan module 16 which is not mechanically connected to the gas generator module 12. The fan is positioned downstream of the fan turbine so that the efflux from the fan turbine passes through the fan: the fan also draws in air along a bypass duct 17. A mixing device 18 causes a certain amount of mixing at the juncture between the bypass flow and the turbine exhaust flow before these two flows enter the fan 14.

The gas generator section 12 of the engine comprises a multi-stage compressor 20, a combustor 21 and a two-stage turbine 22 and is a self-contained module which is mechanically separate from the aft fan module. The turbine 22 extracts work from the hot gas stream sufficient to drive the compressor 20. The fan turbine 13 receives the exhaust from turbine 22 and extracts work therefrom to drive the fan. This turbine is so designed that the temperature of the hot gas stream at its outlet is relatively low. With such an arrangement the fan can be constructed of low temperature materials, such as titanium alloys, thus keeping down the weight and the expense of the aft fan module.

The gas generator section 12 of the engine is mounted on bearings 23,24 through structure to a flow divider island 25, the island 25 is supported by links 26 from the pylon 11 and constitutes a divider for separating the flow which passes into the gas generator section 12 from that which passes along the bypass duct 17. The bypass duct is surrounded by an exterior cowl 27.

The aft fan assembly of fan turbine 13, fan 14 and shaft 15 is mounted on two bearings, the first bearing 30 being at its upstream end and the second bearing 31 being at its downstream end and the design of the engine enables the aft fan module to be removed entirely for maintenance purposes without disturbing the gas generator module. The front bearing 30 is supported through stationary structure in the same way as bearing 24 of the gas generator module. The rear bearing 31 is supported through stationary structure which includes a series of aerofoil section vanes 32. Downstream of the vanes 32 the inner annulus of the gas duct finishes in a round bullet 33 and the cowl 27 finishes at its downstream end in a variable area nozzle at 34.

The aft fan 14 is of large diameter and at its tip passes very close to a portion of cowl 27. A seal is provided at this portion of cowl 27, the details of which have not been shown in the drawing.

Figure 3:
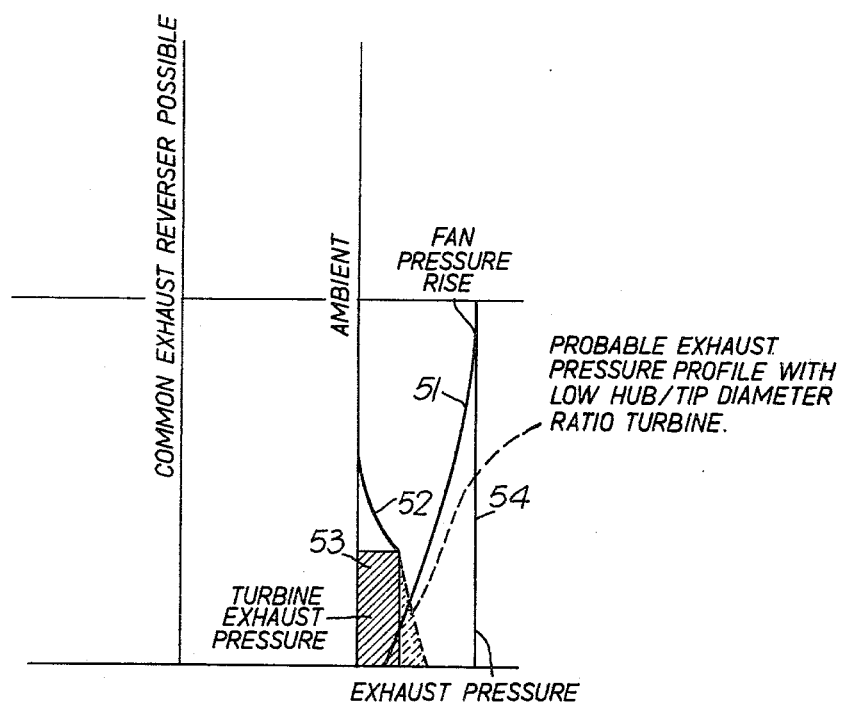

It is a well-known characteristic of large diameter fans that the pressure ratio which can be developed across the tip is higher than that which can be achieved at the hub because of the higher rotational speed of the tip. FIG. 3 shows the pressure rise across the fan. The pressure rise across a ducted fan which receives only a flow of air from the bypass duct is indicated by reference numeral 51 in FIG. 3 from which it will be seen that the pressure rise is greatest at the tip of the fan. The design of the present invention enables to some extent the pressure rise across the ducted fan to be equalized. The gas leaving the fan turbine 13 is at a higher pressure than the air being drawn down the bypass duct 17 and about to enter the outer regions of the fan 14. Although there is a certain amount of mixing in the mixing device 18 the mixed turbine exhaust and cold air which is delivered by the inner radial portions of the fan blading nearest the hub will arrive at the downstream end of the fan with a pressure which is the resultant of their pressure at the inlet to the fan and the pressure ratio across the hub of the fan. The pressure of the mixed exhaust and cold air at the inlet to the fan is represented in FIG. 3 by the line 52. The hatched portion 53 is particularly shown representing the fan turbine exhaust pressure. Because the entry pressure of these gases at the hub is higher than the entry pressure of the gases at the tip, the exhaust pressure is therefore closer to the exhaust pressure at the tip and thus a more uniform delivery pressure is achieved across the exit face of the fan. This can be seen from FIG. 3 where if the pressure rise indicated by line 52 is added to the pressure rise indicated by line 51 then the resultant is a more uniform outlet pressure from the fan, that is to say, the resultant pressure rise will approach the ideal uniform outlet pressure rise indicated by the straight line 54. The reduced pressure rise required at the inner portions of the fan to achieve a uniform outlet pressure across the exit face of the fan permits a lower fan blade speed and this lower speed together with the improved mixing and consequently more uniform velocity across the exit face of the fan contributes to an increased propulsive efficiency and to a reduced overall noise level.

A mixing device is not essential, the combination of the gas leaving the fan turbine with the air being drawn down the bypass duct could be obtained by sufficiently spacing the fan downstream from the fan turbine.

Another advantage of mixing the hot and the cold flows is that the gas delivered by the fan is less sensitive to infra-red detection.

Figure 2:
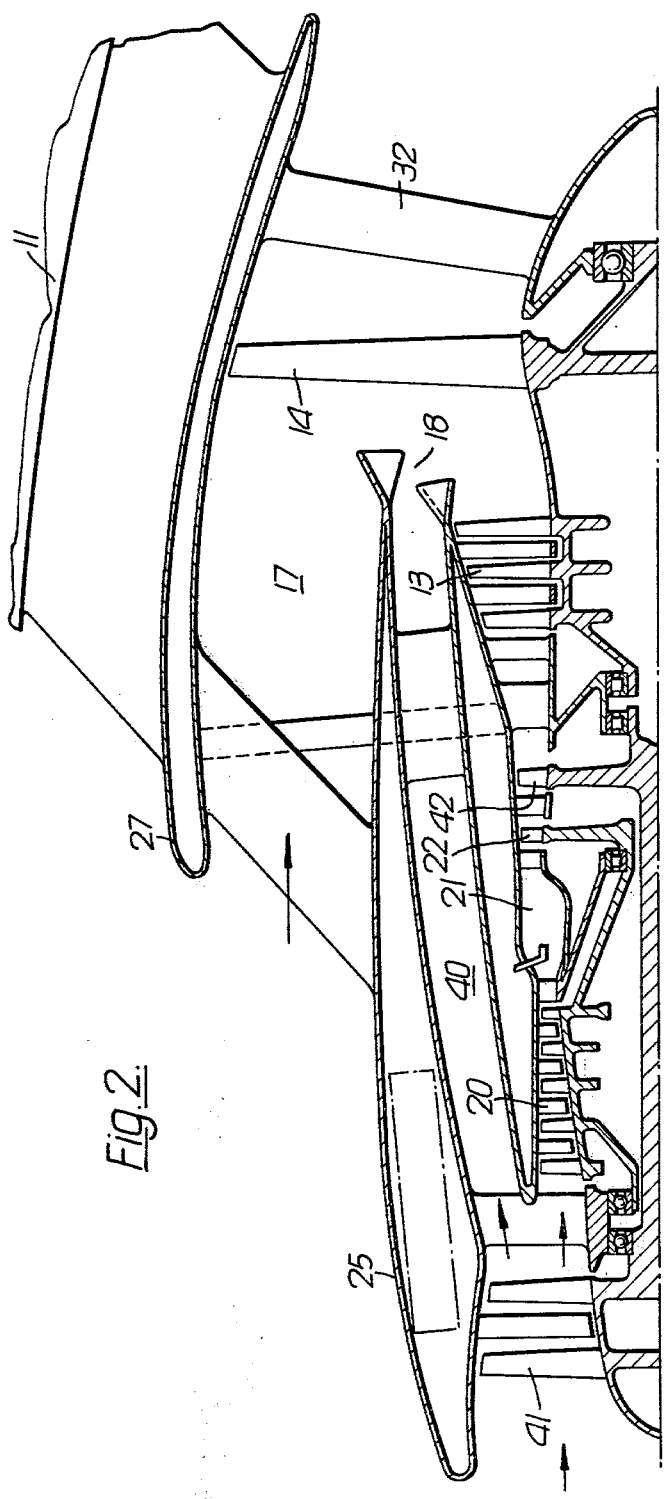

FIG. 2 shows a variant of the engine shown in FIG. 1 in which the gas generator module drives an additional low bypass ratio front fan which delivers air not only to the gas generator module 12 but also deliveres air into an intermediate bypass duct 40. In this Figure like references have been used for like parts to FIG. 1. The front fan comprises a single row of blading 41 driven by a single stage turbine 42. The delivery of turbine 42 drives the fan turbine 13 which in turn drives the aft fan 14 and air from the intermediate bypass duct 40 mixes at a mixing device 18 with air which has been drawn along bypass duct 17 but also with the exhaust of turbine 13.

The arrangements shown in the drawings both have the advantage that engine accessories, such as the fuel system, can be located within the annular island 25 and can be driven from the gas generator. This removes the requirement of present high bypass ratio engines, for driving the accessories through a long shaft requiring steady bearing with the accessories mounted in the engine outer casing.

I claim:

1. In a gas turbine engine powerplant comprising a gas generator, a fan turbine arranged downstream of the gas generator to be driven by an efflux of gas from the gas generator, a by-pass duct, a fan driven by the fan turbine and mounted for rotation in the by-pass duct and arranged to receive an efflux of gas from the gas generator, and in which the pressure of the efflux of the gas generator downstream of the fan turbine exceeds the pressure of the air flowing along the by-pass duct immediately ahead of the fan; the method of producing a more uniform outlet pressure of efflux across the exit face of the fan comprising the steps of mixing the higher pressure efflux of the gas generator with the lower pressure air from the by-pass duct and delivering the mixed flow to the inner radial portions of the fan, and maintaining a pressure differential across the entry face of the fan with highest pressure at the entry face of the fan radially innermost.

2. In a gas turbine engine powerplant comprising a gas generator, first and second turbines located downstream of the gas generator to be driven by an efflux of gas therefrom, first and second by-pass ducts, a front fan driven by the first turbine, the front fan being mounted for rotation in the first by-pass duct and arranged to supply compressed air to the gas generator, and an aft fan driven by the second turbine and mounted for rotation in the second by-pass duct, the aft fan being arranged to receive an efflux of gas from the gas generator, and in which the pressure of the efflux exceeds the pressure of the air from the first and second by-pass ducts immediately ahead of the aft fan;

the method of producing a more uniform outlet pressure of efflux across the exit face of the aft fan comprising the steps of mixing the higher pressure efflux of the gas generators with the lower pressure air from the first and second by-pass ducts and delivering the mixed flow to the inner radial portions of the aft fan, and maintaining a pressure differential across the entry face of the fan with the highest pressure at the entry face of the aft fan radially innermost.

* * * * *